United States Patent
Wang et al.

(10) Patent No.: US 11,630,444 B2
(45) Date of Patent: Apr. 18, 2023

(54) ARTIFICIAL INTELLIGENCE EMPOWERED INDUSTRIAL INTERNET OF THINGS

(71) Applicant: International Business Machines Corporation, Armonk, NY (US)

(72) Inventors: Xinlin Wang, Irvine, CA (US); Guo Qiang Hu, Shanghai (CN); Peng Ji, Nanjing (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 17/107,738

(22) Filed: Nov. 30, 2020

(65) Prior Publication Data

US 2022/0171371 A1  Jun. 2, 2022

(51) Int. Cl.
| | | |
|---|---|---|
| G05B 19/418 | (2006.01) | |
| G06N 20/00 | (2019.01) | |
| G05B 13/02 | (2006.01) | |
| G06N 5/04 | (2023.01) | |

(52) U.S. Cl.
CPC ... *G05B 19/41835* (2013.01); *G05B 13/0265* (2013.01); *G06N 5/04* (2013.01); *G06N 20/00* (2019.01); *G05B 2219/31368* (2013.01)

(58) Field of Classification Search
CPC .......................... G05B 19/41835; G06N 20/00
USPC .................................................... 700/47–55
See application file for complete search history.

(56) References Cited

U.S. PATENT DOCUMENTS

| | | | | |
|---|---|---|---|---|
| 6,965,319 B1* | 11/2005 | Crichlow | ................. | H04Q 9/00 340/870.07 |
| 7,672,737 B2* | 3/2010 | Hood | ..................... | G06Q 10/06 700/86 |
| 2016/0067864 A1* | 3/2016 | Mullan | .................. | B25J 9/1605 700/19 |
| 2017/0039506 A1* | 2/2017 | Phadke | .......... | G06Q 10/063112 |
| 2017/0282375 A1* | 10/2017 | Erhart | .................... | B25J 13/006 |
| 2018/0043532 A1* | 2/2018 | Lection | .................. | B25J 9/1661 |
| 2019/0155659 A1* | 5/2019 | Rodriguez Bravo | ... | H04L 67/75 |
| 2021/0157312 A1* | 5/2021 | Cella | .................. | G05B 23/0286 |

FOREIGN PATENT DOCUMENTS

| | | |
|---|---|---|
| CN | 110524531 A | 12/2019 |
| CN | 110866901 A | 3/2020 |
| CN | 111273892 A | 6/2020 |

OTHER PUBLICATIONS

Saez, Miguel, et al. "Real-time manufacturing machine and system performance monitoring using internet of things." IEEE Transactions on Automation Science and Engineering 15.4 (2018): pp. 1735-1748. (Year: 2018).*

(Continued)

*Primary Examiner* — Satish Rampuria
(74) *Attorney, Agent, or Firm* — Erika R. DeCosty

(57) ABSTRACT

In an approach to AI empowered factory automation using an industrial IoT, responsive to receiving a new production task, production requirements are input into an AI engine. Equipment and software containers are selected based on the AI model. An orchestration service is created, where the orchestration service collaborates the equipment and the software containers.

17 Claims, 10 Drawing Sheets

(56) References Cited

OTHER PUBLICATIONS

Hussein, AbdelRahman H. "Internet of things (IOT): Research challenges and future applications." International Journal of Advanced Computer Science and Applications 10.6 (2019).pp. 77-82 (Year: 2019).*

Madakam, Somayya. "Internet of things: smart things." International journal of future computer and communication 4.4 (2015): pp. 250-253. (Year: 2015).*

Wan, Jiafu, et al. "Software-defined industrial internet of things in the context of industry 4.0." IEEE Sensors Journal 16.20 (2016): pp. 7373-7380. (Year: 2016).*

Adamson, Göran, Lihui Wang, and Philip Moore. "Feature-based function block control framework for manufacturing equipment in cloud environments." International Journal of Production Research 57.12 (2019): pp. 3954-3974. (Year: 2019).*

Meng, Zhaozong, et al. "A data-oriented M2M messaging mechanism for industrial IoT applications." IEEE Internet of Things Journal 4.1 (2016): pp. 236-246. (Year: 2016).*

Mell et al., "The NIST Definition of Cloud Computing", National Institute of Standards and Technology, Special Publication 800-145, Sep. 2011, 7 pages.

Unknown, "INDUSTRIAL EDGE", Siemens.com Global Website © Siemens 1996-2020, pp. 1-13, <https://new.siemens.com/global/en/products/automation/topic-areas/industrial-edge.html>.

Vermesan et al., "Internet of Robotic Things—Converging Sensing/Actuating, Hyperconnectivity, Artificial Intelligence and Iot Platforms", Research Gate, Jun. 2017, pp. 1-61, <https://www.researchgate.net/publication/318012442_Internet_of_Robotic_Things_Converging_SensingActuating_Hyperconnectivity_Artificial_Intelligence_and_IoT_Platforms>.

Xue et al., "Enabling Distributed AI For Quality Inspection in Manufacturing With Edge Computing", IBM Developer, Published Jun. 9, 2020, pp. 1-7.

* cited by examiner

ARTIFICIAL INTELLIGENCE EMPOWERED INDUSTRIAL INTERNET OF THINGS

BACKGROUND

The present invention relates generally to the field of network-based applications, and more particularly to Artificial Intelligence (AI) empowered factory automation using an industrial Internet of Things (IoT).

Factory automation describes the process of incorporating automation into the manufacturing process of end products. With this infrastructure, the manufacturing environment is defined by its ability to manufacture and/or assemble goods primarily by machines, integrated assembly lines, and robotic arms. The automated environments are also defined by their coordination with (and usually their systematic integration with) the required automatic equipment to form a complete system.

Industrial robotics is a sub-branch of industrial automation that aids in various manufacturing processes such as machining, welding, painting, assembling and material handling. Industrial robots use various software-driven mechanical and electrical systems to allow for high precision, accuracy and speed that far exceed any human performance. A robotic arm is a common type of industrial automation with similar functions to a human arm; the arm may be the sum total of the mechanism or may be part of a more complex robot.

An edge cloud architecture is used to decentralize processing power to the edges of the network. Within the cloud model, tasks are performed by servers so they can be transferred to other devices with less or almost no computing power. Edge computing is a part of a distributed computing topology in which information processing is located close to the edge—where things and people produce or consume that information.

SUMMARY

Embodiments of the present invention disclose a method, a computer program product, and a system for AI empowered factory automation using an industrial IoT. In one embodiment, responsive to receiving a new production task, production requirements are input into an AI engine. Equipment and software containers are selected based on the AI model. An orchestration service is created, where the orchestration service collaborates the equipment and the software containers.

DETAILED DESCRIPTION

Figure 1:
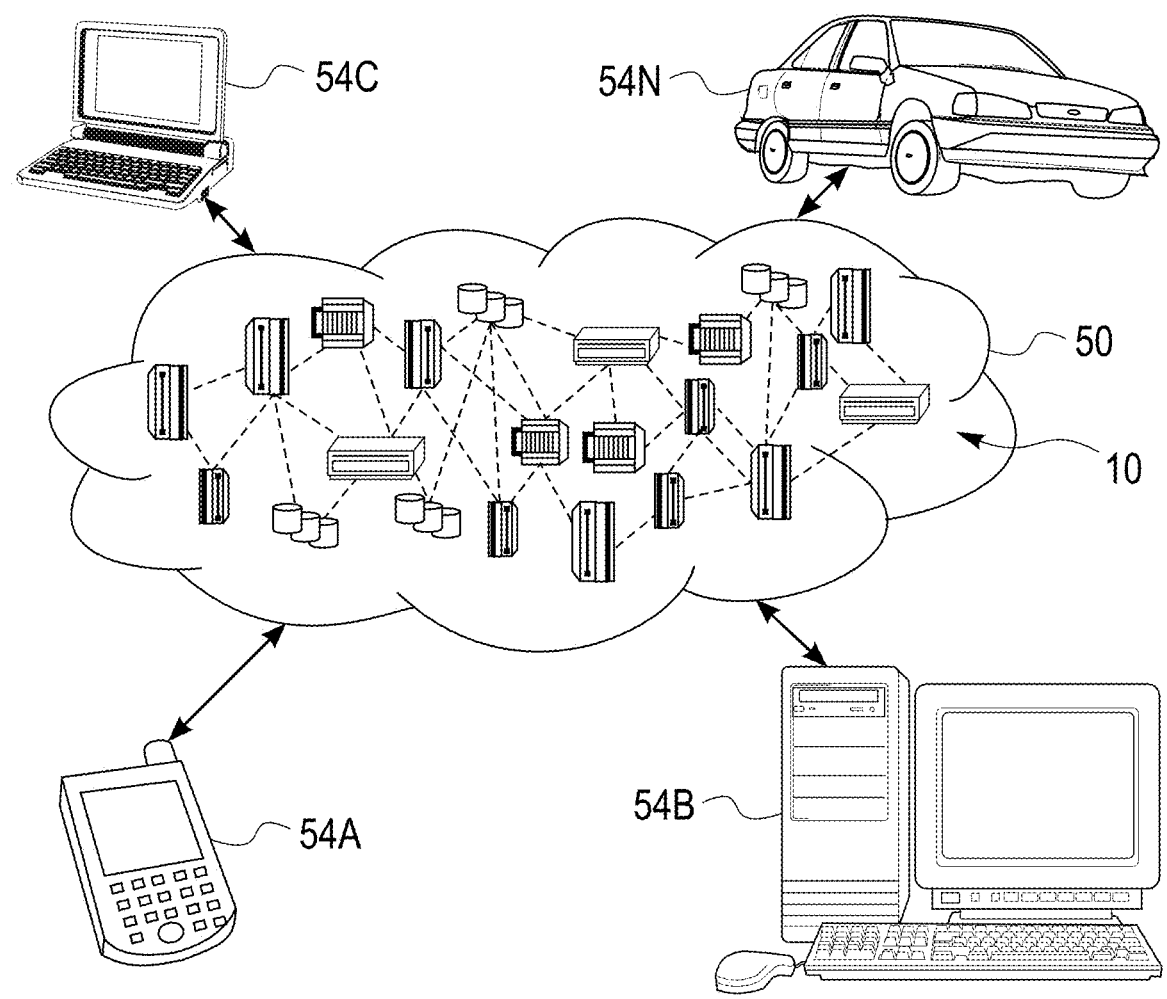
FIG. 1 depicts a cloud computing environment according to an embodiment of the present invention.

An edge device is any piece of hardware that controls data flow at the boundary between two networks. Cloud computing and IoT have elevated the role of edge devices, ushering in the need for more intelligence, computing power and advanced services at the network edge. IoT edge devices solve a fundamental problem associated with the centralization of cloud architecture. While clouds are powerful for storage and processing, they create delays for IoT devices sending data back and forth. By bringing cloud computing capabilities to local devices, IoT edge computing can process data faster, preventing delays, security breaches and other concerns.

Currently, most industrial robots require an attached industrial computer as a controller, where the robot control logic is deployed and executed to drive the physical operation of the robots. When a robot requires AI capabilities (e.g., visual recognition based on camera sensors), the camera sensor has to be attached to an I/O interface on the industrial computer, and the AI models need to be developed and deployed to the industrial computer, potentially requiring multiple rounds of integration and testing. This approach has generated issues, including: high hardware and maintenance costs of the industrial computer, especially the case of hundreds to thousands of robots in an enterprise environment; the need for special packaging (increase cost) for the industrial computer, which may need to work in harsh environments; sensors are attached to robots and thus difficult to share; the difficulty of building and testing the complex collaboration logics in a robot system across multiple robots without the correct AI models and sensors; and the difficulty of scaling the system, especially for an online mode of operation, since more powerful AI models requires more powerful hardware (i.e., scaling is difficult with a fixed industrial computer as controller).

The present invention is a system leveraging a cloud foundation, including a 5G-empowered cloud, to enable various types of IoT sensors, AI models, and robots to collaborate together in a highly effective and scalable manner, and to build an "edge cloud" running on the local edge environment leveraging standard cloud technologies, e.g., containers. The invention extracts robot software functions, e.g., "see and recognize XXX", "pick a XXX", and "listen to a machine sound," from the industrial computer and deploys them as containers running on the edge cloud. This separates the complex functions from the mechanical control functions that remain in the local environment, which are only responsible to take "actions" after it receives the instruction from the containerized functions. Likewise, sensors are detached from the robots to allow their control unit to be deployed separately, with a "sensor controllers" container running on the cloud as well.

The present invention extracts AI models from the software functions, and separately deploys them as containers on the cloud environment. An orchestration service is created to drive the collaboration logic across multiple robots, AI models, and sensors with standard Application Programming Interfaces (APIs). Before the orchestration process, the container images for the relevant control units of the robots and their sensor are updated based on the group of the task they will perform at a certain sequence and their location proximity. The real-time or near-real-time quality of service (QoS) requirements together with the traffic pattern (profile) of each composing container is kept as meta-data of an industrial application and used for bandwidth booking with the network control unit.

The present invention records history usage of each container image and intelligently chooses the correct container image based on the planned task and self-reported location (via the IoT sensors) of the robots. This also solves the inherent difficulty in extending the functionality of a robot with new and customized AI models, since the models only need to be updated in the container, not in every robot in the system. A unified physical environment service (context service) is built which will be leveraged by all sensors, AI models, and robots to enable the effective sharing of knowledge and insights across those components.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
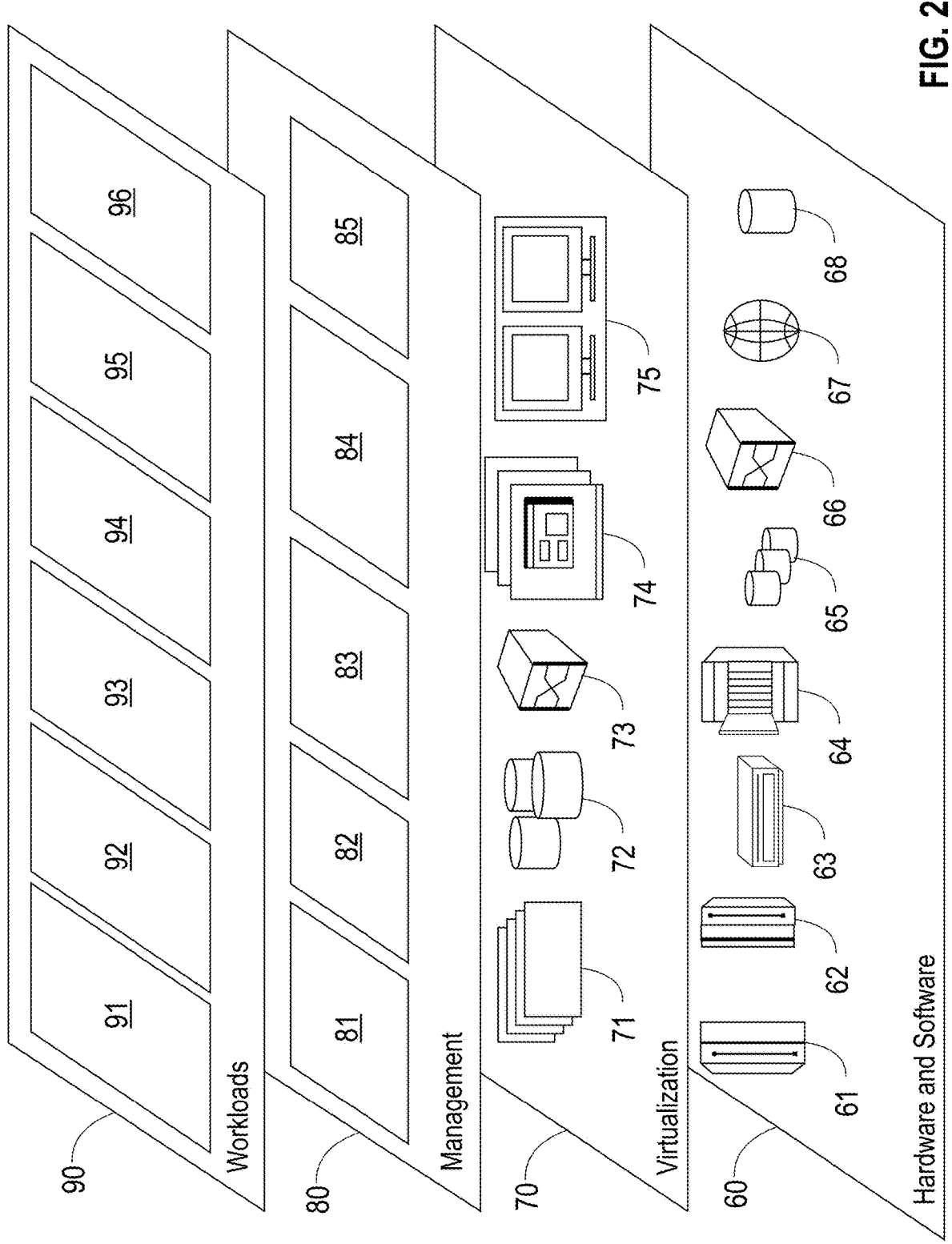
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and industrial IoT program 96.

Figure 3:
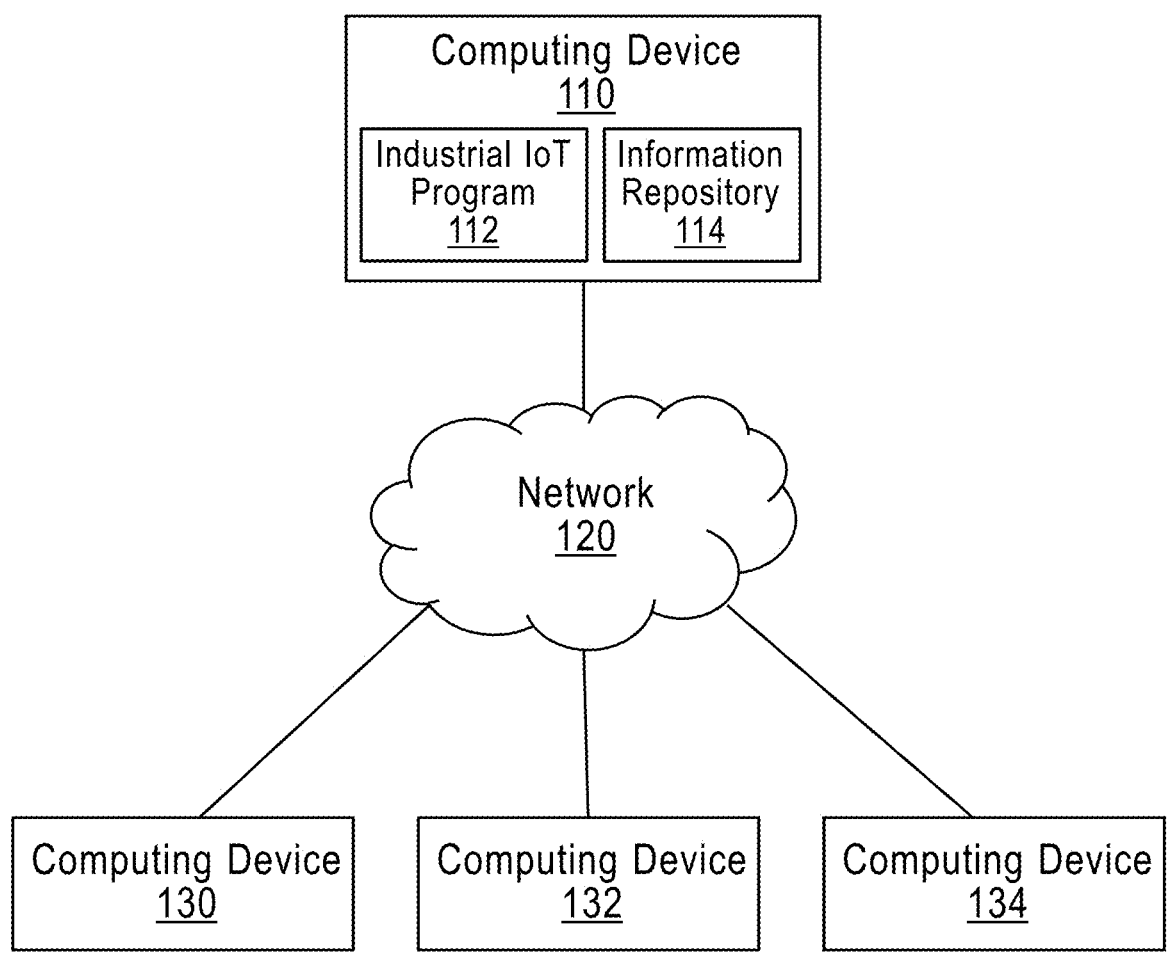
FIG. 3 is a functional block diagram illustrating a distributed data processing environment, in accordance with an embodiment of the present invention.

FIG. 3 is a functional block diagram illustrating a distributed data processing environment, generally designated 100, suitable for operation of industrial IoT program 112 in accordance with at least one embodiment of the present invention. The term "distributed" as used herein describes a computer system that includes multiple, physically distinct devices that operate together as a single computer system. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing devices 110, 130, 132, and 134, all connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing devices 110, 130, 132, and 134, and other computing devices (not shown) within distributed data processing environment 100.

Computing devices 110, 130, 132, and 134 can each be a standalone computing device, a management server, a web server, a mobile computing device, or any other electronic device or computing system capable of receiving, sending, and processing data. In an embodiment, computing devices 110, 130, 132, and 134 can each be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, computing device 110 includes industrial IoT program 112. In an embodiment, industrial IoT program 112 is a program, application, or subprogram of a larger program for AI empowered factory automation using an industrial IoT. In an alternative embodiment, industrial IoT program 112 may be located on any other device accessible by computing device 110 via network 120.

In an embodiment, computing device 110 includes information repository 114. In an embodiment, information repository 114 may be managed by industrial IoT program 112. In an alternate embodiment, information repository 114 may be managed by the operating system of the device, alone, or together with, industrial IoT program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, AI model data, equipment data, sensor data, robot data, software data, cloud configuration data, user data, system configuration data, and other data that is received by industrial IoT program 112 from one or more sources, and data that is created by industrial IoT program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Figure 4:
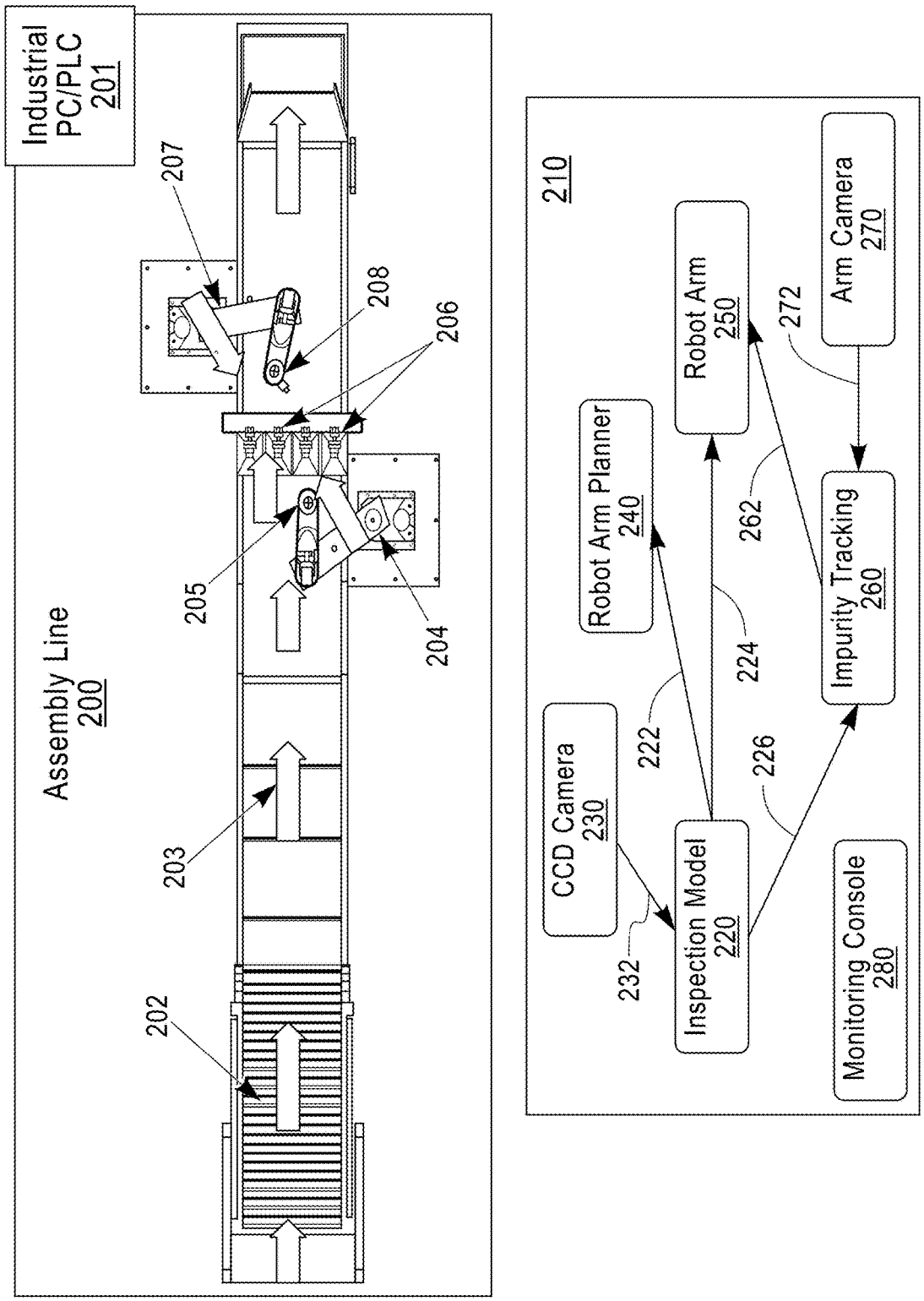
FIG. 4 is an example of a factory automation system using existing art.

FIG. 4 is an example of a factory automation system using existing art. It includes assembly line 200, which is an example of a generic assembly line in a factory. In this example, the assembly line is for removing impurities in a food product. Industrial PC/PLC 201 is an industrial personal computer or programmable logic controller that operates all the equipment on assembly line 200. This equipment includes: vibrator 202, a vibrating conveyor belt; conveyor belts 203, which are multi-tiered conveyor belts; robot arms 204 and 207, each with a robot arm camera (arm camera 205 and arm camera 208, respectively); and a bank of Charge-Coupled Device (CCD) cameras 206 (4 in this illustration).

Software 210 is the software controlling the equipment in assembly line 200. Software 210 includes inspection model 220, the main function of software 210. This model controls all the hardware on assembly line 200. CCD camera 230 is the module that controls the CCD cameras. In this example, there would be four instances of this module running to control the four CCD cameras 206. Camera feed 232 is the feed of the image data from CCD cameras 206 to inspection model 220. Robot arm planner 240 is the module that determines the movement of the robot arms. Control feed 222 is the feed from inspection model 220 to robot arm planner 240. Robot arm 250 is the module that controls the robot arms. In this example, there are two instances of this module running to control the two robot arms, robot arm 204 and robot arm 207. Robot arm feed 224 is the control feed from inspection model 220 to robot arm 250. There is one feed for each instance of robot arm 250. This feed includes impurities found along with the type and locations of the impurities for the robot to remove.

Impurity tracking 260 is the module that tracks impurities as the product moves down the conveyor belt system. In this example, there are two instances of this module running, one to track the impurities assigned to each of the two robot arms. Inspection feed 226 is the control feed from inspection model 220 to impurity tracking 260. There is one feed for each instance of impurity tracking 260. This feed includes the location of impurities found that have been assigned for each robot to remove. Impurity tracking feed 262 is the control feed from impurity tracking 260 to robot arm 250. There is one feed for each instance of robot arm 250. This feed includes the location of impurities that have been assigned that particular robot to remove, as well as notifications of removal failures. Arm camera 270 is the module that controls the camera mounted on each robot arm. There is one instance per robot arm (two total in this example). Impurity image feed 272 is the feed of the image data from arm camera 270 to impurity tracking 260. There is one feed for each instance of robot arm 250. This feed includes tracking video of impurity removal. Monitoring console 280 is the module that provides information to a system operator of all phases of the operation of assembly line 200.

In the example of FIG. 4, industrial PC/PLC 201 contains and executes all the software functions required to operate assembly line 200. This requires a computer that is designed for harsh environments like a factory floor, adding cost to the computer. In addition, if the production line needs to be modified, the software must be modified and tested for the new configuration. If the new software requirements exceed the capacity of industrial PC/PLC 201, then industrial PC/PLC 201 needs to be upgraded or replaced before the new production line can be implemented. Finally, if the production line is no longer required, then redeploying the equipment from assembly line 200 also requires completely new software on industrial PC/PLC 201.

Figure 5:
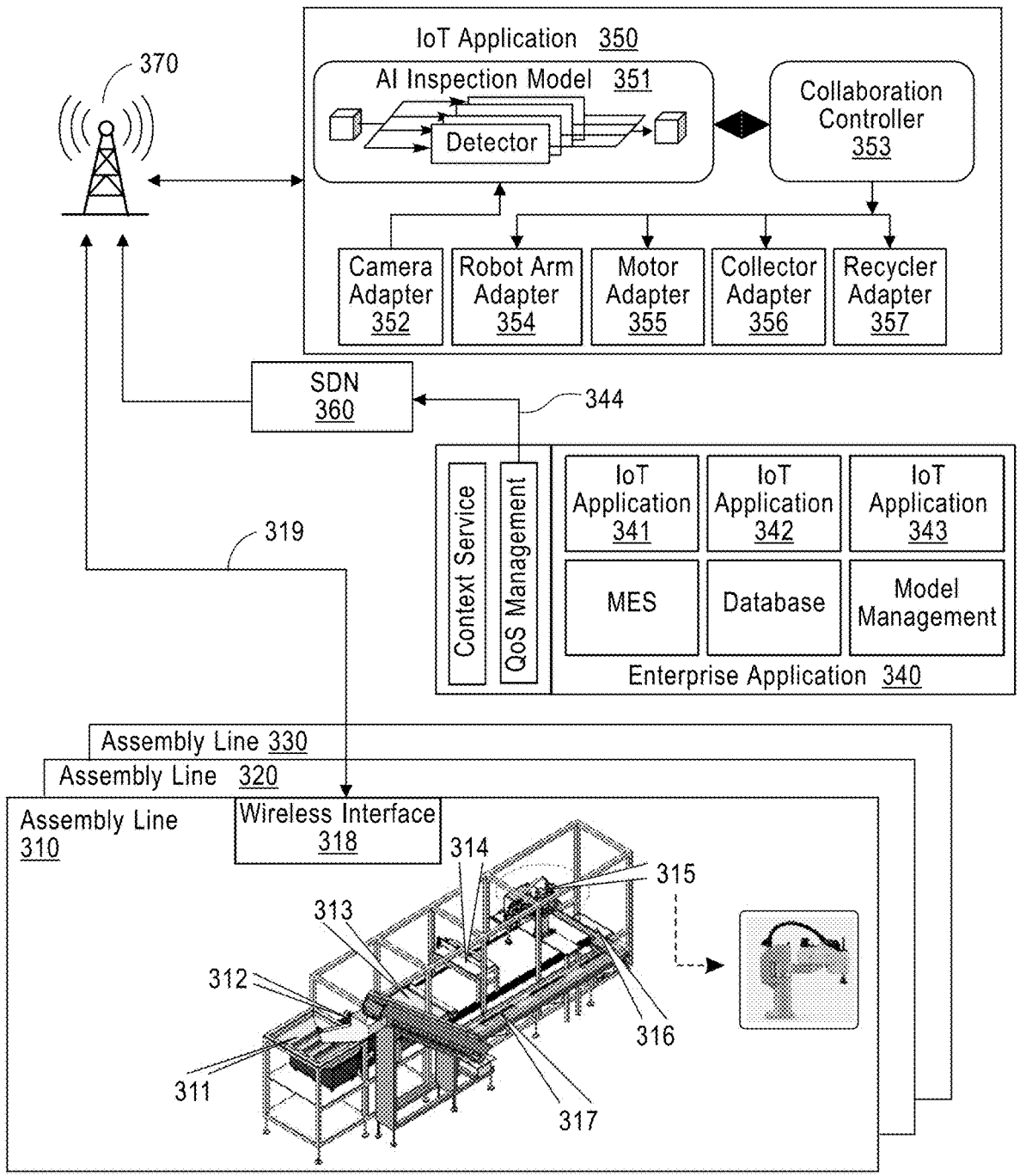
FIG. 5 is an example of a factory automation system using the present invention, within the distributed data processing environment of FIG. 3, in accordance with an embodiment of the present invention.

FIG. 5 is an example of a factory automation system using the present invention, within the distributed data processing environment of FIG. 3, in accordance with an embodiment of the present invention. This example illustrates the same factory as in FIG. 4, but with the present invention implemented for AI empowered factory automation using an industrial IoT. In this example, the present invention has replaced the local computer, e.g., industrial PC/PLC 201 from FIG. 4, by moving all the higher control logic from the local computer to containers in a cloud environment. By removing the higher control logic from the local computer, the present invention allows for greater flexibility in the configuration of a factory for a new production task. In addition, the capability of the factory automation is no longer restricted by the capacity of the local computer. If a new production task requires greater computing capacity, the present invention simply allocates more cloud resources to the new production task.

The example in FIG. 5 illustrates a case where three identical assembly lines are operating, assembly line 310, assembly line 320, and assembly line 330. In this example, as in the example of FIG. 4, the assembly line is for removing impurities in a food product. In this example, however, multiple assembly lines are controlled by a single edge cloud-based system, running one instance of the runtime application, IoT application instance 350, for each assembly line. While only assembly line 310 is fully illustrated, everything discussed below applies to assembly line 320 and assembly line 330.

In this example, each assembly line includes feeder 311, to feed the food product into the line; vibration 312, a vibrating conveyor belt; filler 313; cameras 314; robot arms 315, each with a robot arm camera; collector 316; and recycler 317. Wireless interface 318 is the interface to cloud 370, which is, for example, cloud computing environment 50 from FIG. 1. Cloud connection 319 represents the connection between wireless interface 318 and cloud 370. There would be at least one connection 319 between each assembly line and cloud 370.

Enterprise application 340 is the software controlling the equipment in assembly lines 310, 320, and 330. IoT application instance 341, IoT application instance 342, and IoT application instance 343 represent the instances of IoT application 350 that are executing in enterprise application 340. Each instance controls one of assembly lines 310, 320, or 330. QoS connection 344 is the connection between the QoS block of the application and Software Defined Network (SDN) 360. When configuring the equipment for each assembly line (310, 320, and/or 330), enterprise application 340 calculates the required bandwidth based on the output of the AI engine, and notifies SDN 360 of the latency and bandwidth requirements to enable SDN 360 to reserve the necessary capacity from cloud 370.

IoT application 350 is the software controlling the equipment in one of assembly lines 310, 320, or 330. IoT application 350 includes the following components: AI inspection model 351, object recognition model for visual inspection of product quality (e.g., surface defects, assembly completeness/correctness, impurities, etc.); camera adapter 352, a software adapter that interfaces to the physical camera device; collaboration controller 353, a service orchestration engine or a workflow engine that organizes all functional components together to form a specific application; robot arm adapter 354, a software adapter that interfaces the robot device; motor adapter 355, a software adapter that interfaces the production line conveyor belt motor control; collector adapter 356, a software adapter that interfaces the collector device control (in this example, a collector is a special device in the production line that is used to collect the food product at the end of the production line); and recycler adapter 357, a software adapter that interfaces the recycler device control (the recycler is a special device in the production that selectively transfers a portion of the food product back to the input of the production line (e.g., re-entering the inspection line for double check of impurities).

Figure 6:
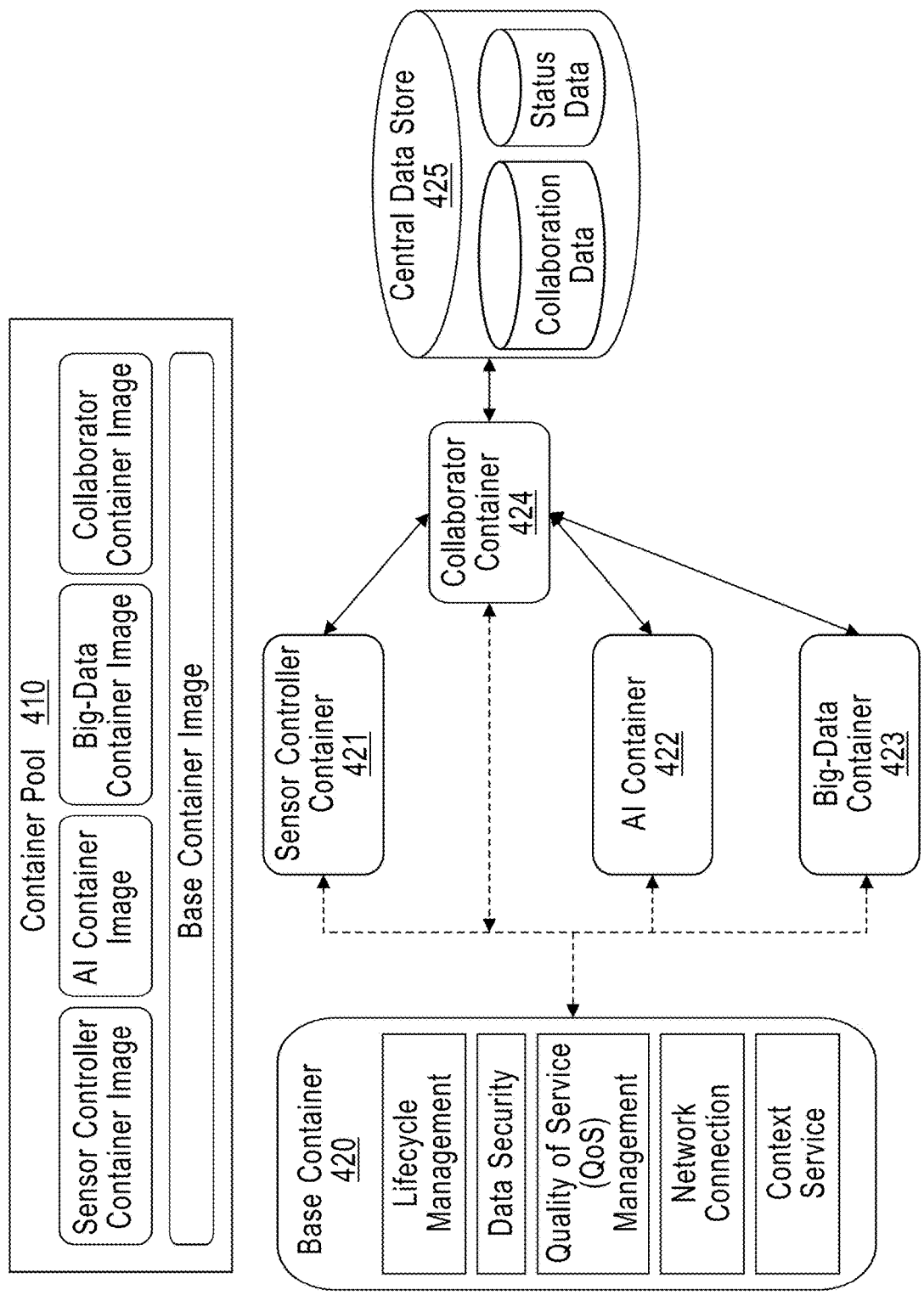
FIG. 6 is an example of the containerization of the system, in accordance with an embodiment of the present invention.

FIG. 6 is an example of the containerization of the system, in accordance with an embodiment of the present invention. In this example, container pool 410 is the collection of container images that were extracted in by the invention in FIG. 8. These images will be selected by industrial IoT program 112 using the AI engine when a new task is assigned. All the following containers are instances of these images.

Base container 420 is the container that represents the base functions necessary for all systems built by industrial IoT program 112. This includes, for example, lifecycle management, data security, QoS management, network connections, and context services. Sensor controller container 421 is the container for the software that controls the various sensors on the equipment for the assembly line. In an embodiment, AI container 422 is the container for the AI engine that is used by industrial IoT program 112 to select the appropriate equipment and containers each time a new production task is received. In another embodiment, AI container 422 is the container for the AI engine that is used by industrial IoT program 112 when a robot requires AI capabilities (e.g., visual recognition based on camera sensors). Big-data container 423 is the container for the software that controls the transfer and processing of the large quantity of data required by industrial IoT program 112. This data includes, for example, stream analytics and Online Analytical Processing (OLAP). Collaborator container 424 is the container for the service orchestration or workflow engine that organizes all functional components together to form a specific application. Central data store 425 is the data storage for the application. It consists of storage for collaboration data and for status data. In an embodiment, this would be part of Information Repository 114.

Figure 7:
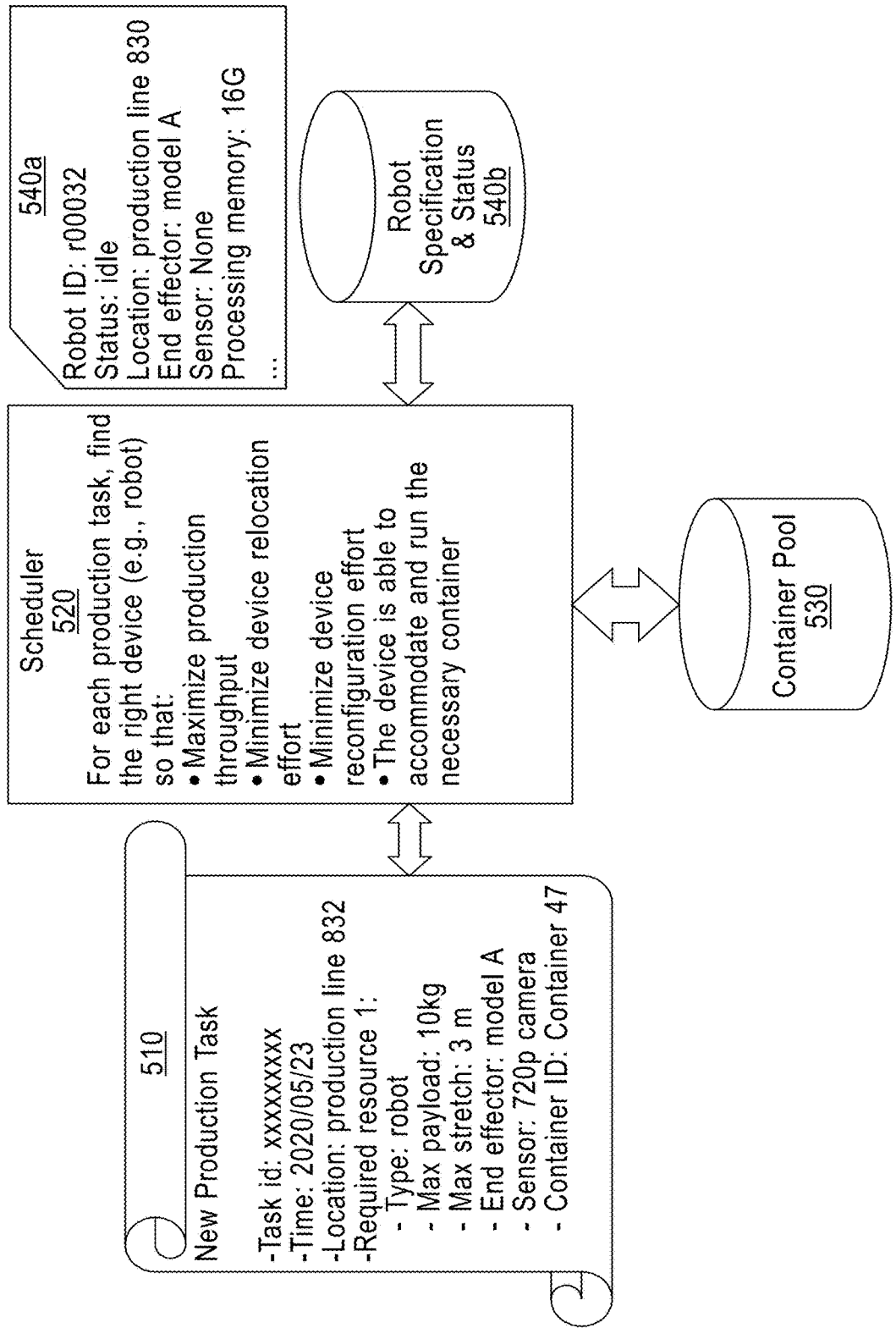
FIG. 7 is an example of the selection and deployment of the containers by the Industrial IoT Program using the AI engine, in accordance with an embodiment of the present invention.

FIG. 7 is an example of the selection and deployment of the containers by the Industrial IoT Program using the AI engine, in accordance with an embodiment of the present invention. In this example, new production task 510 represents a new production task received by industrial IoT program 112. In this example, the only required resource is an industrial robot. Industrial IoT program 112 receives the requirements for the industrial robot with the production task. Scheduler 520 illustrates how industrial IoT program 112 uses the AI engine to select the appropriate device based on the requirements of new production task 510. Based on the requirements received in new production task 510, industrial IoT program 112 searches the available devices in container pool 530 to select the best device. In an embodiment, industrial IoT program 112 uses the history of the device and its location to select the best device for the application.

Container Pool 530 is the container pool holding the containers for all devices and software that have been compiled by the AI engine. This is container pool 410 of FIG. 6. In this example, based on the results from the AI engine, industrial IoT program 112 has selected robot specification & status record 540a. Robot specification & status record 540a is an example of a record for a particular robot, as stored in robot specification & status 540b, which represents the storage for the records for the particular robot chosen by scheduler 520 from container pool 530.

Figure 8:
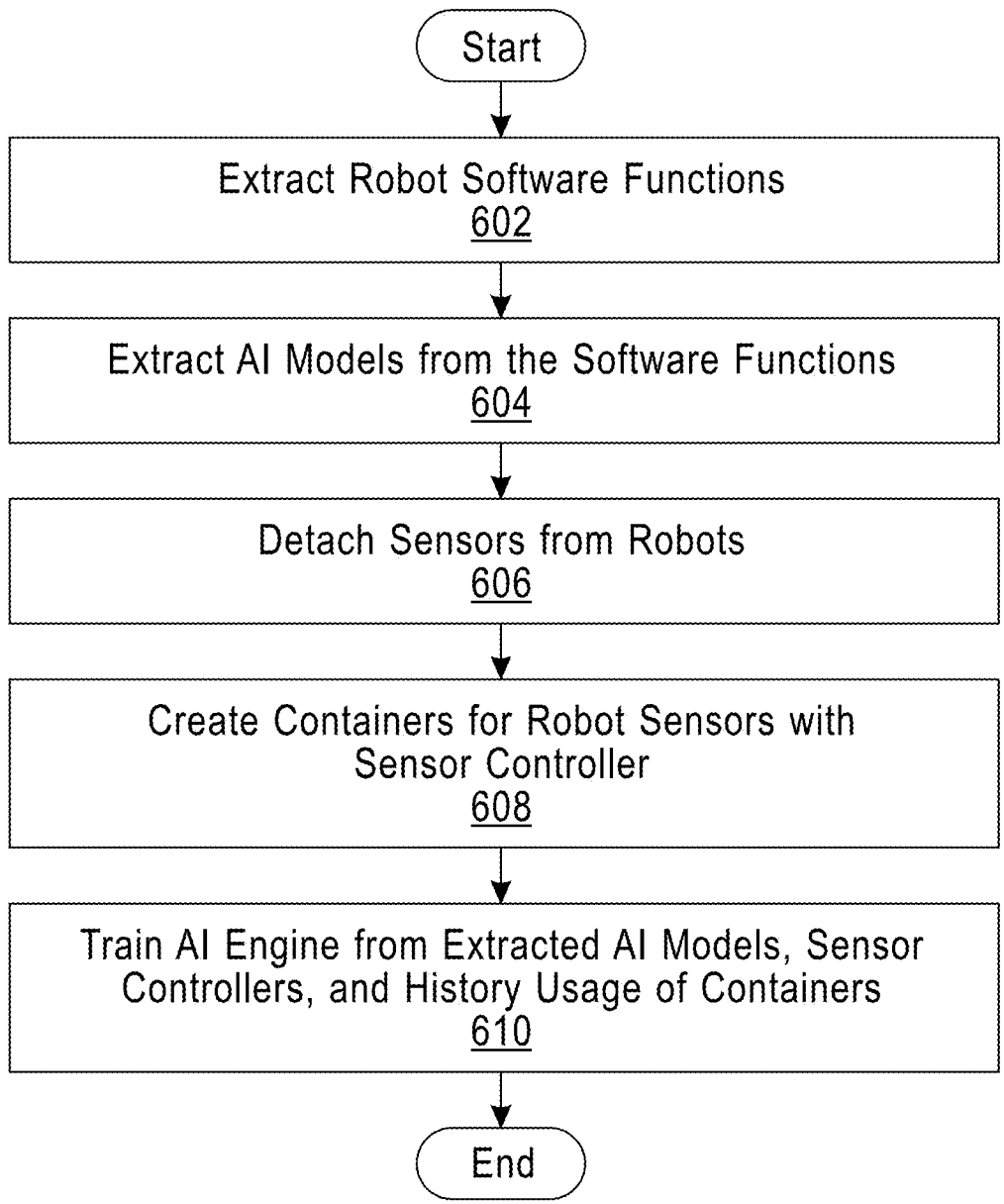
FIG. 8 is a flowchart depicting operational steps for the initialization of the industrial IoT program, including training the AI engine, in accordance with an embodiment of the present invention.

FIG. 8 is a flow chart diagram of workflow 600 depicting operational steps for the initialization of industrial IoT program 112, including training the AI engine, in accordance with an embodiment of the present invention. In an alternative embodiment, the steps of workflow 600 may be performed by any other program while working with industrial IoT program 112. In an embodiment, industrial IoT program 112 extracts robot software functions, such as "see and recognize XXX", "pick a XXX", "listen to a machine sound" in the "industrial computer" from the mechanical control software. In an embodiment, industrial IoT program 112 extracts "AI models" from the software functions, and deploys them separately as containers on the Cloud environment. In an embodiment, industrial IoT program 112 virtually detaches sensors from the robots so that the sensor control unit can be deployed separately, with a "sensor controllers" as a container running on the cloud. In an embodiment, industrial IoT program 112 creates containers for the robotic sensors that were detached from the robotic control software previously so that the sensors can be managed by the cloud-based sensor controller. In an embodiment, industrial IoT program 112 trains the AI engine from the AI models and the sensor controllers extracted previously, and the history of usage of the individual containers. Industrial IoT program 112 then ends for this cycle.

It should be appreciated that embodiments of the present invention provide at least for the initialization of industrial IoT program 112, including training the AI engine, for AI empowered factory automation using an industrial IoT. However, FIG. 8 provides only an illustration of one implementation and does not imply any limitations with regard to the environments in which different embodiments may be implemented. Many modifications to the depicted environment may be made by those skilled in the art without departing from the scope of the invention as recited by the claims.

Industrial IoT program 112 extracts robot software functions (step 602). In an embodiment, industrial IoT program 112 extracts robot software functions, such as "see and recognize XXX", "pick a XXX", "listen to a machine sound" in the "industrial computer" from the mechanical control software. After this extraction, the mechanical control software is only responsible to take actions after it receives an instruction from industrial IoT program 112. Those higher logic functions that were extracted are deployed as containers running on top of the edge cloud. In an embodiment, industrial IoT program 112 calculates the network bandwidth required by the extracted functions, and stores the required network bandwidth in the metadata of the container.

Industrial IoT program 112 extracts AI models from the software functions (step 604). In an embodiment, industrial IoT program 112 extracts AI models from the software functions, and modifies the AI models to allow them to be packaged in a container that can be flexibly deployed and reused. In an embodiment, the AI models are extracted to allow the software function and the physical control functions to be separated. This allows the AI models to be deployed separately as containers in the cloud environment.

Industrial IoT program 112 detaches sensors from robots (step 606). In an embodiment, industrial IoT program 112 virtually detaches sensors from the robots so that the sensor control unit can be deployed separately, with a sensor controller, e.g., sensor controller container 421 from FIG. 6, as a container running on the cloud. Prior to detaching the sensors from the robots, the sensor is an auxiliary component hidden under a robot device. In an embodiment, industrial IoT program 112 detaches the sensor by flattening the device hierarchy so as to treat each individual sensor as a software endpoint that can be programmed (in terms of adapters), modularized, and connected into an information processing flow diagram of the application.

Industrial IoT program 112 creates containers for robot sensors with a sensor controller (step 608). In an embodiment, industrial IoT program 112 creates containers for the robotic sensors that were detached from the robotic control software in step 606 so that the sensors can be managed by the cloud-based sensor controller. In an embodiment, industrial IoT program 112 assigns a specific version of the software in the container, which is determined by the self-reported physical location of the equipment. In this way, industrial IoT program 112 assures that the correct version of the software container is selected in FIG. 9 based on the location of the equipment. In an embodiment, industrial IoT program 112 develops a software adapter for each type or model of a device on the basis of the device driver. In an embodiment, the software adapter can be containerized as a reusable sensor controller.

Industrial IoT program 112 trains the AI engine from extracted AI models, sensor controllers, and history usage of containers (step 610). In an embodiment, industrial IoT program 112 trains the AI engine from the AI models extracted in step 604, the sensor controllers from step 606 and step 608, and the history of usage of the individual containers. Industrial IoT program 112 then ends for this cycle. In an embodiment, industrial IoT program 112 continually records the usage history of each container and equipment, and updates the AI models with the usage history data for each container and each equipment.

Figure 9:
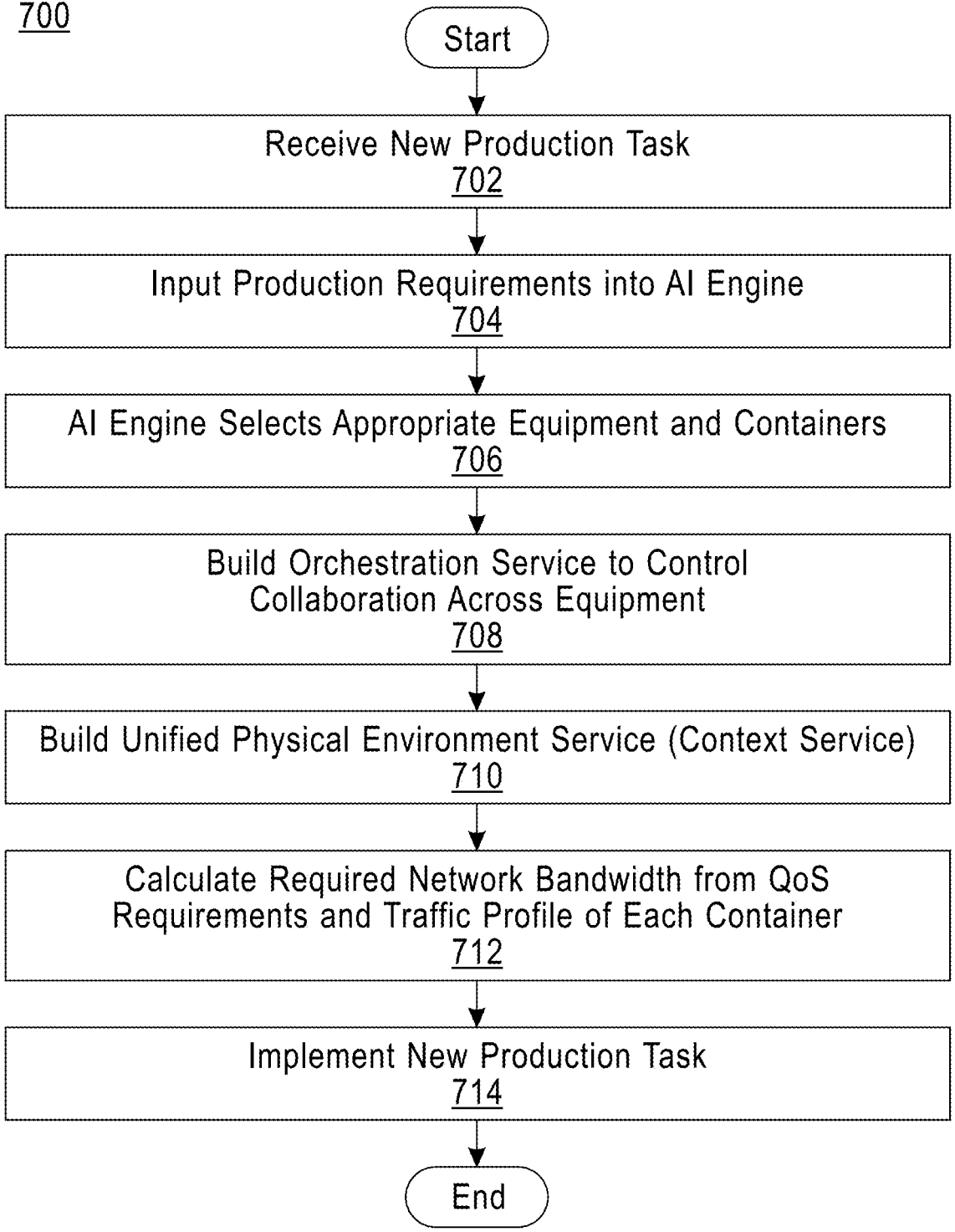
FIG. 9 is a flowchart depicting operational steps for the main functions of the industrial IoT program, in accordance with an embodiment of the present invention.

FIG. 9 is a flow chart diagram of workflow 700 operational steps for the main functions of the industrial IoT program, for AI empowered factory automation using an industrial IoT, in accordance with an embodiment of the present invention. In an alternative embodiment, the steps of workflow 700 may be performed by any other program while working with industrial IoT program 112. In an embodiment, industrial IoT program 112 receives a new task for a production facility, such as new production task 510 from FIG. 7. In an embodiment, industrial IoT program 112 inputs the production requirements from the New Production Task received in the first step into the AI engine. In an embodiment, industrial IoT program 112 searches the container pool, e.g., Container Pool 410 from FIG. 6, to select the best equipment and containers to control that equipment for the new production task. In an embodiment, industrial IoT program 112 builds an orchestration service to control the collaboration across the equipment selected in the previous step. In an embodiment, industrial IoT program 112 builds a unified physical environment service (context service) which is leveraged by all sensors, AI models, and robots to enable the effective sharing of knowledge and insights across those components. In an embodiment, industrial IoT program 112 uses the requirements data received in the new production task request along with the history data for each piece of equipment and container previously selected to calculate the required bandwidth to meet the QoS requirements also received in the new production task request. In an embodiment, industrial IoT program 112 then implements the new production task into an operational system. Industrial IoT program 112 then ends for this cycle.

It should be appreciated that embodiments of the present invention provide at least for the main functions performed by industrial IoT program 112 for AI empowered factory automation using an industrial IoT. However, FIG. 9 provides only an illustration of one implementation and does not imply any limitations with regard to the environments in which different embodiments may be implemented. Many modifications to the depicted environment may be made by those skilled in the art without departing from the scope of the invention as recited by the claims.

Industrial IoT program 112 receives new production task (step 702). In an embodiment, industrial IoT program 112 receives a new task for a production facility, such as new production task 510 from FIG. 7. The new production task includes required resources, such as robot specification & status record 540a from FIG. 5. In an embodiment, industrial IoT program 112 receives a new production assignment from a manufacturing execution system (MES). In an embodiment, each assignment includes the product type/model/quantity/timeline of each task as well as the production processing flow and parameters.

Industrial IoT program 112 inputs production requirements into the AI engine (step 704). In an embodiment, industrial IoT program 112 inputs the production requirements from the new production task received in step 702 into the AI engine. The AI engine has previously been trained with the equipment and containers for operation of the equipment in the factory in FIG. 8 above.

Industrial IoT program 112 uses the AI engine to select appropriate equipment and containers (step 706). In an embodiment, industrial IoT program 112 searches the container pool, e.g., container pool 410 from FIG. 6, to select the best equipment and containers to control that equipment for the new production task. In an embodiment, industrial IoT program 112 selects the best equipment and containers based on the requirements in the new production task, the history of the various equipment and containers in the pool, as well as the physical location and transportability of the equipment. In an embodiment, industrial IoT program 112 selects the best equipment and containers for the application based on the required tasks and the self-reported location of each required piece of equipment. In another embodiment, industrial IoT program 112 selects the best containers for the application based on the specific version of the software container, which is determined by the self-reported physical location of the equipment. In an embodiment, the specific version was assigned to the container in step 608 of FIG. 8 above.

Industrial IoT program 112 builds an orchestration service to control collaboration across the equipment (step 708). In an embodiment, industrial IoT program 112 builds an orchestration service to control the collaboration across the equipment selected in step 706. In an embodiment, the orchestration service is a program that connects all the software/equipment modules to work together according to predefined workflow configuration. In an embodiment, industrial IoT program 112 assembles all the selected containers and builds a collaboration container, e.g., collaboration container 422 from FIG. 6, based on the containers that were selected in step 706 and the history of these containers from the docker pool.

Industrial IoT program 112 builds a unified physical environment service (context service) (step 710). In an embodiment, industrial IoT program 112 builds a unified physical environment service (context service) which is leveraged by all sensors, AI models, and robots to enable the effective sharing of knowledge and insights across those components. In an embodiment, the context service built by industrial IoT program 112 includes a spatial-temporal coordinate system that provides for an AI-based automatic calibration (mapping) procedure between local spatial-temporal coordinates of different devices.

In an embodiment, the unified physical environment service provides the spatial-temporal coordinate mapping among the different spatial-temporal coordinate system of each individual device. In an embodiment, to do so, industrial IoT program 112 creates a mapping function needs between any pair of devices. In another embodiment, industrial IoT program 112 defines an additional abstract spatial-temporal coordinate system a mapping function is maintained between this reference system and the coordinate system of any device. In some embodiments, the spatial-temporal coordinate system of one specific device can be nominated as the reference system. In some embodiments, the mapping function can be either determined via a manual calibration procedure or by an automatic procedure. In addition, if spatial-temporal data is related to moving objects (e.g., the location information in pictures of a series of production cameras when a product item moves over a conveyor belt), the movement pattern of the object needs to be further modeled for the spatial-temporal coordinate mapping.

Industrial IoT program 112 calculates the required network bandwidth from the QoS requirements and the traffic profile of each container (step 712). In an embodiment, industrial IoT program 112 uses the requirements data received in the new production task request along with the history data for each piece of equipment and container selected in step 706 to calculate the required bandwidth to meet the QoS requirements also received in the new production task request. In an embodiment, industrial IoT program 112 sends the required bandwidth to a software defined network, such as SDN 360 from FIG. 5, to reserve the necessary bandwidth on the cloud.

Industrial IoT program 112 implements the new production task (step 714). In an embodiment, industrial IoT program 112 then implements the new production task into an operational system. Industrial IoT program 112 then ends for this cycle.

Figure 10:
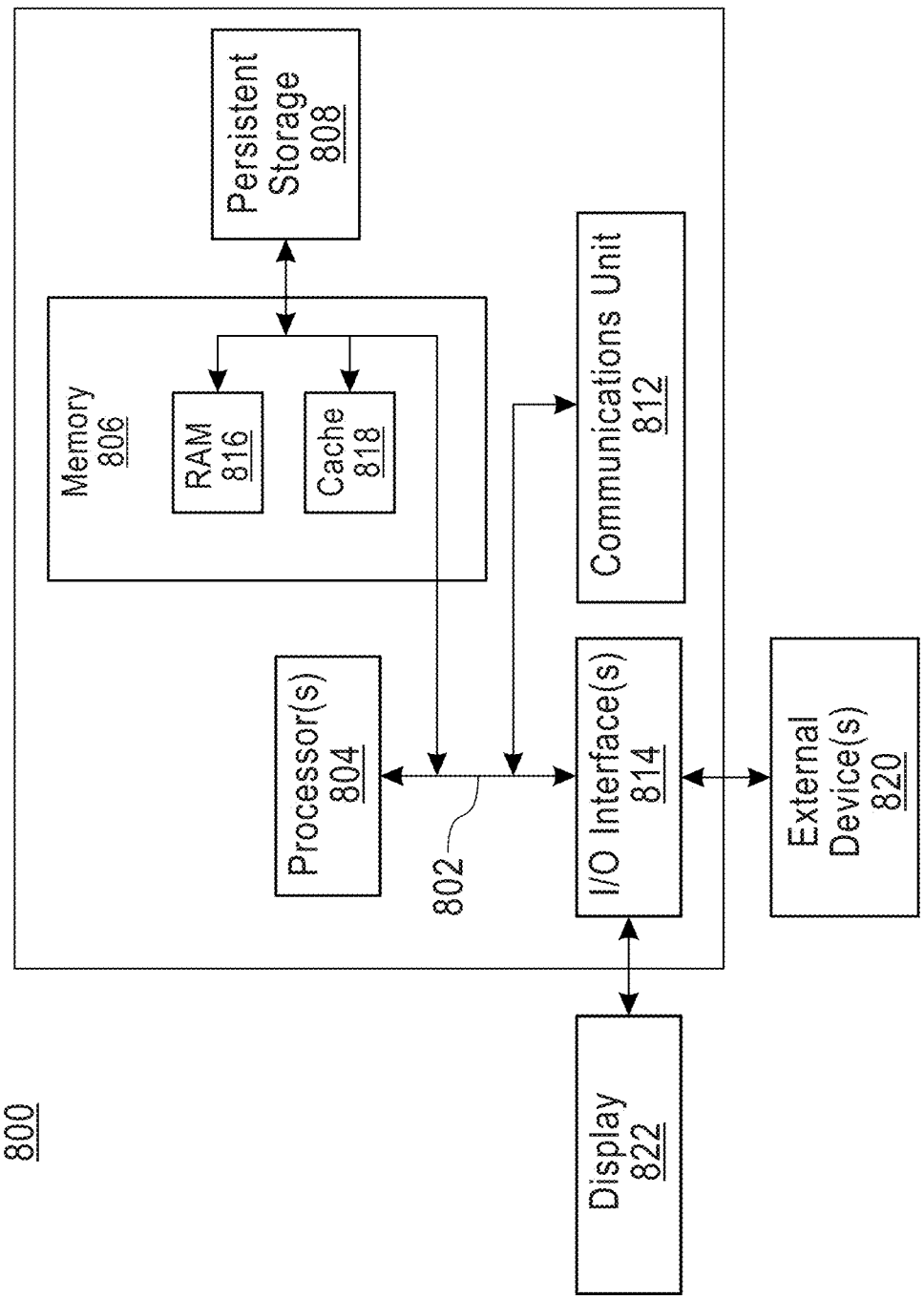
FIG. 10 depicts a block diagram of components of the computing devices executing the industrial IoT program within the distributed data processing environment of FIG. 3, in accordance with an embodiment of the present invention.

FIG. 10 is a block diagram depicting components of computing device 110 suitable for industrial IoT program 112, in accordance with at least one embodiment of the invention. FIG. 8 displays computer 800; one or more processor(s) 804 (including one or more computer processors); communications fabric 802; memory 806, including random-access memory (RAM) 816 and cache 818; persistent storage 808; communications unit 812; I/O interfaces 814; display 822; and external devices 820. It should be appreciated that FIG. 8 provides only an illustration of one embodiment and does not imply any limitations with regard to the environments in which different embodiments may be implemented. Many modifications to the depicted environment may be made.

As depicted, computer 800 operates over communications fabric 802, which provides communications between computer processor(s) 804, memory 806, persistent storage 808, communications unit 812, and I/O interface(s) 814. Communications fabric 802 may be implemented with any architecture suitable for passing data or control information between processors 804 (e.g., microprocessors, communications processors, and network processors), memory 806, external devices 820, and any other hardware components within a system. For example, communications fabric 802 may be implemented with one or more buses.

Memory 806 and persistent storage 808 are computer readable storage media. In the depicted embodiment, memory 806 comprises RAM 816 and cache 818. In general, memory 806 can include any suitable volatile or non-volatile computer readable storage media. Cache 818 is a fast memory that enhances the performance of processor(s) 804 by holding recently accessed data, and near recently accessed data, from RAM 816.

Program instructions for industrial IoT program 112 may be stored in persistent storage 808, or more generally, any computer readable storage media, for execution by one or more of the respective computer processors 804 via one or more memories of memory 806. Persistent storage 808 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 812, in these examples, provides for communications with other data processing systems or devices. In these examples, communications unit 812 includes one or more network interface cards. Communications unit 812 may provide communications through the use of either or both physical and wireless communications links. In the context of some embodiments of the present invention, the source of the various input data may be physically remote to computer 800 such that the input data may be received, and the output similarly transmitted via communications unit 812.

I/O interface(s) 814 allows for input and output of data with other devices that may be connected to computer 800. For example, I/O interface(s) 814 may provide a connection to external device(s) 820 such as a keyboard, a keypad, a touch screen, a microphone, a digital camera, and/or some other suitable input device. External device(s) 820 can also include portable computer readable storage media such as, for example, thumb drives, portable optical or magnetic disks, and memory cards. Software and data used to practice embodiments of the present invention, e.g., industrial IoT program 112, can be stored on such portable computer readable storage media and can be loaded onto persistent storage 808 via I/O interface(s) 814. I/O interface(s) 814 also connect to display 822.

Display 822 provides a mechanism to display data to a user and may be, for example, a computer monitor. Display 822 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for factory automation, the computer-implemented method comprising:
    responsive to receiving a new production task, inputting, by one or more computer processors, one or more production requirements into an Artificial Intelligence (AI) engine;
    selecting, by the one or more computer processors, one or more equipment and one or more software containers based on output data from the AI engine;
    extracting, by the one or more computer processors, one or more AI models from one or more robot software functions controlled by one or more robots;
    detaching, by the one or more computer processors, one or more sensor functions from the one or more robots;
    deploying, by the one or more computer processors, the one or more robot software functions, the one or more AI models, and the one or more detached sensor functions in the selected one or more software containers on an edge cloud; and
    creating, by the one or more computer processors, an orchestration service, wherein the orchestration service collaborates the one or more equipment and the one or more software containers.

2. The computer-implemented method of claim 1, further comprising:
    recording, by the one or more computer processors, a history usage of each container of the one or more containers; and
    updating, by the one or more computer processors, each AI model of the one or more AI models based on the history usage.

3. The computer-implemented method of claim 1, further comprising:
    creating, by the one or more computer processors, a context service, wherein the context service maintains a spatial context and a temporal context for each equipment of the one or more equipment.

4. The computer-implemented method of claim 1, further comprising:
    extracting, by the one or more computer processors, a Quality of Service (QoS) requirement and a network traffic profile for each container of the one or more containers;
    calculating, by the one or more computer processors, a required network bandwidth for each container of the one or more containers, wherein the required network bandwidth is based on the QoS requirement and the traffic profile; and
    storing, by the one or more computer processors, the required network bandwidth as metadata in each container of the one or more containers.

5. The computer-implemented method of claim 1, wherein selecting the one or more equipment and the one or more software containers based on the AI engine further comprises:
    selecting, by the one or more computer processors, a specific equipment from the one or more equipment, wherein the specific equipment is selected based on the production requirements and one or more attached sensors; and
    determining, by the one or more computer processors, a specific version of one software container of the one or more software containers, wherein the specific version of one software container is determined by a physical location of the specific equipment.

6. The computer-implemented method of claim 1, further comprising an AI-based automatic calibration procedure, wherein the AI-based automatic calibration procedure calibrates a set of local spatial-temporal coordinates between a plurality of the one or more equipment.

7. A computer program product for factory automation, the computer program product comprising one or more computer readable storage media and program instructions stored on the one or more computer readable storage media, the program instructions including instructions to:
    responsive to receiving a new production task, input one or more production requirements into an Artificial Intelligence (AI) engine;
    select one or more equipment and one or more software containers based on output data from the AI engine;
    extract, by the one or more computer processors, one or more AI models from one or more robot software functions controlled by one or more robots;
    detach, by the one or more computer processors, one or more sensor functions from the one or more robots;
    deploy, by the one or more computer processors, the one or more robot software functions, the one or more AI models, and the one or more detached sensor functions in the selected one or more software containers on an edge cloud; and
    create an orchestration service, wherein the orchestration service collaborates the one or more equipment and the one or more software containers.

8. The computer program product of claim 7, further comprising one or more of the following program instructions, stored on the one or more computer readable storage media, to:
    record a history usage of each container of the one or more containers; and
    update each AI model of the one or more AI models based on the history usage.

9. The computer program product of claim 7, further comprising one or more of the following program instructions, stored on the one or more computer readable storage media, to:
    create a context service, wherein the context service maintains a spatial context and a temporal context for each equipment of the one or more equipment.

10. The computer program product of claim 7, further comprising one or more of the following program instructions, stored on the one or more computer readable storage media, to:
    extract a Quality of Service (QoS) requirement and a network traffic profile for each container of the one or more containers;

calculate a required network bandwidth for each container of the one or more containers, wherein the required network bandwidth is based on the QoS requirement and the traffic profile; and store the required network bandwidth as metadata in each container of the one or more containers.

11. The computer program product of claim 7, wherein select the one or more equipment and the one or more software containers based on the AI engine further comprises one or more of the following program instructions, stored on the one or more computer readable storage media, to:

select a specific equipment from the one or more equipment, wherein the specific equipment is selected based on the production requirements and one or more attached sensors; and determine a specific version of one software container of the one or more software containers, wherein the specific version of one software container is determined by a physical location of the specific equipment.

12. The computer program product of claim 7, further comprising an AI-based automatic calibration procedure, wherein the AI-based automatic calibration procedure calibrates a set of local spatial-temporal coordinates between a plurality of the one or more equipment.

13. A computer system for factory automation, the computer system comprising:

one or more computer processors;

one or more computer readable storage media; and program instructions stored on the one or more computer readable storage media for execution by at least one of the one or more computer processors, the stored program instructions including instructions to:

responsive to receiving a new production task, input one or more production requirements into an Artificial Intelligence (AI) engine;

select one or more equipment and one or more software containers based on output data from the AI engine;

extract, by the one or more computer processors, one or more AI models from one or more robot software functions controlled by one or more robots;

detach, by the one or more computer processors, one or more sensor functions from the one or more robots;

deploy, by the one or more computer processors, the one or more robot software functions, the one or more AI models, and the one or more detached sensor functions in the selected one or more software containers on an edge cloud; and create an orchestration service, wherein the orchestration service collaborates the one or more equipment and the one or more software containers.

14. The computer system of claim 13, further comprising one or more of the following program instructions, stored on the one or more computer readable storage media, to:

record a history usage of each container of the one or more containers; and update each AI model of the one or more AI models based on the history usage.

15. The computer system of claim 13, further comprising one or more of the following program instructions, stored on the one or more computer readable storage media, to:

create a context service, wherein the context service maintains a spatial context and a temporal context for each equipment of the one or more equipment.

16. The computer system of claim 13, further comprising one or more of the following program instructions, stored on the one or more computer readable storage media, to:

extract a Quality of Service (QoS) requirement and a network traffic profile for each container of the one or more containers;

calculate a required network bandwidth for each container of the one or more containers, wherein the required network bandwidth is based on the QoS requirement and the traffic profile; and store the required network bandwidth as metadata in each container of the one or more containers.

17. The computer system of claim 13, wherein select the one or more equipment and the one or more software containers based on the AI engine further comprises one or more of the following program instructions, stored on the one or more computer readable storage media, to:

select a specific equipment from the one or more equipment, wherein the specific equipment is selected based on the production requirements and one or more attached sensors; and determine a specific version of one software container of the one or more software containers, wherein the specific version of one software container is determined by a physical location of the specific equipment.

* * * * *